(12) United States Patent
Hall et al.

(10) Patent No.: US 10,168,788 B2
(45) Date of Patent: Jan. 1, 2019

(54) AUGMENTED REALITY USER INTERFACE

(71) Applicant: GetGo, Inc., Fort Lauderdale, FL (US)

(72) Inventors: Tyler McKay Hall, Santa Barbara, CA (US); Albert Alexandrov, Goleta, CA (US)

(73) Assignee: GetGo, Inc., Boston, MA (US)

( * ) Notice: Subject to any disclaimer, the term of this patent is extended or adjusted under 35 U.S.C. 154(b) by 56 days.

(21) Appl. No.: 15/385,330

(22) Filed: Dec. 20, 2016

(65) Prior Publication Data

US 2018/0173315 A1      Jun. 21, 2018

(51) Int. Cl.
| | |
|---|---|
| G06F 3/01 | (2006.01) |
| H04L 29/06 | (2006.01) |
| G06F 3/0481 | (2013.01) |
| G06F 9/451 | (2018.01) |
| G02B 27/01 | (2006.01) |

(52) U.S. Cl.
CPC ........... *G06F 3/017* (2013.01); *G02B 27/017* (2013.01); *G06F 3/013* (2013.01); *G06F 3/04815* (2013.01); *G06F 9/452* (2018.02); *H04L 67/38* (2013.01); *G02B 2027/0187* (2013.01)

(58) Field of Classification Search
CPC ...... G06F 3/017; G06F 3/013; G06F 3/04815; G06F 9/452; G06F 9/4445; G02B 27/0172; G02B 2027/0174; H04L 67/38
See application file for complete search history.

(56) References Cited

U.S. PATENT DOCUMENTS

| | | | |
|---|---|---|---|
| 8,928,558 B2 | 1/2015 | Lewis et al. | |
| 9,041,622 B2 | 5/2015 | McCulloch et al. | |
| 2013/0016070 A1* | 1/2013 | Starner | G02B 27/017 345/175 |
| 2013/0147686 A1* | 6/2013 | Clavin | G06F 3/013 345/8 |
| 2017/0216728 A1 | 8/2017 | Logan et al. | |
| 2018/0061137 A1* | 3/2018 | Jung | G06T 19/006 |

FOREIGN PATENT DOCUMENTS

WO      2017/071829      5/2017

* cited by examiner

*Primary Examiner* — Peter D McLoone
(74) *Attorney, Agent, or Firm* — BainwoodHuang

(57) ABSTRACT

A technique for interacting with a computing device includes operating an AR (Augmented Reality) headset as a UI (user interface) component of the computing device. The technique includes pairing the AR headset with the computing device to establish a communication pathway between the two. Once pairing is established, the AR headset detects gestures of the user and transmits UI metadata derived from the gestures to the computing device. The computing device is configured to receive the UI metadata over the communication pathway and to map the UI metadata to user operations to be performed on the computing device. The technique thereby enables the user to control the computing device using gestures.

22 Claims, 8 Drawing Sheets

AUGMENTED REALITY USER INTERFACE

BACKGROUND

Computerized systems commonly employ input devices for receiving user input. For example, users can enter text into their computers using keyboards and can operate user controls using mouse devices, trackballs, touchpads, and/or touchscreens. Such input devices may be integral to the computing devices, as in the case of tablet computers, or they may be separate devices connected to the computing devices using cables, e.g., USB cables, or wirelessly, e.g., using Bluetooth.

Computerized systems commonly also employ visual display devices, such as monitors, projectors, passive screens, touch screens, and the like. These devices render graphical and/or command line output, which the user can see and to which the user can respond.

SUMMARY

Unfortunately, conventional UI devices tend to keep users in a fixed position relative to their computers. Users must generally sit or stand in front of their computers, where they are not free to move around. Many people find sitting or standing in a fixed position for a long time to be uncomfortable, and recent studies have pointed to detrimental health effects of spending large amounts of time sitting.

Also, when giving presentations based on content viewed from a computer, presenters must often stay close to their computers. Presenters are generally not free to venture far from their machines for long, as they must typically return in order to advance their presentations. Such constraints can negatively impact the quality of presentations, as presenters may be less active and demonstrative as they might be otherwise.

In contrast with prior approaches for interacting with computers, which can highly constrain a user's physical position and activities, an improved technique for interacting with a computing device includes operating an AR (Augmented Reality) headset as a UI (user interface) component of the computing device. The AR headset includes a computer, as well as a set of cameras and other equipment. The technique includes pairing the AR headset with the computing device to establish a communication pathway between the two. Once pairing is established, the AR headset detects gestures of the user and transmits UI metadata derived from the gestures to the computing device. The UI metadata describes the gestures and/or translations of gestures into control instructions and/or data. The computing device is configured to receive the UI metadata over the communication pathway and to map the UI metadata to user operations to be performed on the computing device. The improved technique thereby enables the user to control the computing device using gestures, and frees the user from always having to sit or stand directly in front of the computing device in order to use it.

In some examples, the AR headset identifies, within its field of view, a display area of the computing device (e.g., a monitor area, screen, projected image, other graphical rendering, or any portion thereof) and constructs a "portal" that circumscribes the display area. The portal defines a graphical region that the computing device and the AR headset have in common. The portal also provides a shared canvas on which both the computing device and the AR headset can render content. The computing device can render content on the portal directly by outputting pixel data to its display, and the AR headset can render content on the portal by providing pixel data for the portion of its own display where the display area of the computing device appears. In some examples, the computing device provides digital content to the AR headset, which the AR headset renders in the portal. Also, in some examples, the AR headset provides digital content to the computing device, which the computing device renders in the portal. The AR headset and the computing device may thus act as peers, with each able to render content on the display of the other.

According to some examples, the portal includes two layers: a first layer of graphical content to be displayed by the computing device and a second layer of graphical content to be rendered by the AR headset, i.e., in the region of the AR headset's own display identified as the portal. In an example, both the computing device and the AR headset can contribute content to both layers. Content in the first layer is visible to anyone in sight of the computing device's display, and is thus public, whereas content in the second layer is visible only to the user through the AR headset, and is thus private.

In some examples, the AR headset presents user controls in the form of "holograms," i.e., virtual 3-D objects projected through the AR headset, and the user interacts with a software program running on the computing device by interacting with the holograms. The AR headset may render such holograms in any location, such as within the portal, outside the portal, on a plane parallel with that of the portal, or in any location and/or orientation.

In some examples, at least some of the holograms and their functions are specific to a software program running on the computing device. For example, the AR headset receives UI control input from the computing device specifying AR-aware UI controls that the software program supports. In further examples, the AR headset displays holograms that provide general control options applicable to most software programs, whether they are AR-aware or not.

In some examples, pairing is performed in response to the AR headset detecting an image element shown on the display of the computing device. The image element presents address or other identifying information that identifies the computing device (e.g., a network address). The AR headset acquires an image of the image element and obtains the address or other identifying information therefrom. The AR headset then sends a connection request to the computing device identified by the image element. The computing device receives the connection request and responds to establish the communication pathway.

In some examples, pairing proceeds in an entirely automatic fashion, with a connection between the AR headset and the computing device established without user intervention, such that the user may seamlessly and effortlessly assume gesture-based control over the computing device, as naturally as would occur if the user were to operate a computer's keyboard or mouse. In other examples, pairing is semi-automatic, with the user required to perform some gesture or other act to confirm that pairing should proceed.

In some examples, the AR headset emits a presence signal, which computing devices in the vicinity of the AR headset can detect. Each such computing device responds to the presence signal by displaying an image element, thereby enabling pairing to proceed, e.g., in response to the AR headset acquiring the image element for a particular computing device and, in some cases, by detecting a particular gesture performed by the user.

In some examples, a server broadcasts information about computing devices, such as their identifying information and locations, in a local space. The AR headset may receive this information and initiate pairing with one of the local computing devices, e.g., in response to the user orienting (e.g., establishing gaze) in the direction of a particular computing device and/or in response to detecting some other user gesture.

In some examples, the AR headset stores or otherwise has access to resources, such as documents, slide shows, pictures, and the like. In accordance with some examples, the user can operate the AR headset to transfer content from the AR headset (or a network-connected location available to the AR headset) to the first layer of the portal, such that the computing device displays the content. For example, the AR headset can detect a gesture that the user performs on a system hologram that represents particular content, followed by a user gaze in a direction that intersects with the portal. The AR headset interprets these user actions as an instruction to render the particular content on the display of the computing device, such that the content is made visible to anyone in view of the computing device's display. If the display is rendered using a projector, these actions make the content from the AR headset visible to anyone who can see the projected images.

In some examples, the software program is a web conferencing program and displaying the content in the software program effects sharing of that content with other participants in the web conference.

In some examples, the software program is a remote desktop control program that controls a remote computing device, such that operating the AR headset effects control over the remote computing device.

In some examples, the AR headset displays UI controls but not screen content from the computing device. Rather, such screen content is viewable directly by the user through the transparent display. In other examples, the AR headset does display screen content from the computing device. Examples include screen content of a primary display, screen content of an extended display (e.g., a second monitor), and/or screen content of a mirrored display.

Certain embodiments are directed to a method of controlling a computing device using an AR (Augmented Reality) headset. The method includes pairing the AR headset with the computing device to establish a communication pathway between the AR headset and the computing device. The method further includes detecting, by the AR headset, gestures of a user of the AR headset and transmitting UI (User Interface) metadata derived from the gestures to the computing device over the communication pathway, such that the computing device is enabled to map the UI metadata to user operations to be performed on the computing device in response to the gestures.

Other embodiments are directed to an AR headset constructed and arranged to perform a method of controlling a computing device, such as the method described above. Still other embodiments are directed to a computer program product. The computer program product stores instructions which, when executed on control circuitry of an AR headset, cause the AR headset to perform a method of controlling a computing device, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for interacting with a computing device includes operating an AR (Augmented Reality) headset as a UI (user interface) component of the computing device. The AR headset includes its own computer, and the technique includes pairing the AR headset with the computing device to establish a communication pathway between the two. Once pairing is established, the AR headset detects gestures of the user and transmits UI metadata derived from the gestures to the computing device. The computing device is configured to receive the UI metadata over the communication pathway and to map the UI metadata to user operations to be performed on the computing device.

AR is a quickly-developing technology that projects holograms, i.e., computer-generated 3-D images, onto a transparent display, such that the holograms appear to the user as if they are part of the user's natural environment. The display is part of a headset, which typically also includes cameras, speakers, a microphone, and a computer. The cameras scan the local environment, and the computer creates a map of the user's surroundings. The AR headset may project holograms in such a way that they appear to have constant spatial locations and orientations. For example, an AR headset can place a hologram in what appears to the user to be a stable position, such as on a wall, a table, or at a fixed distance from the user. The AR headset detects movement and changes in orientation and adjusts the holograms so that they appear to remain stationary. The headset projects different images for left and right eyes, producing a true 3-D effect. Users can interact with a particular hologram by using one or more "gestures," e.g., motions of hands, feet, etc., which can be detected by the cameras. The term gestures as used herein also includes "gaze," i.e., a sustained orientation of the AR headset in a particular direction. A non-limiting example of an AR headset that is suitable for use with embodiments hereof is the Microsoft HoloLens, which is available from Microsoft Corporation of Redmond, Wash.

Figure 1:
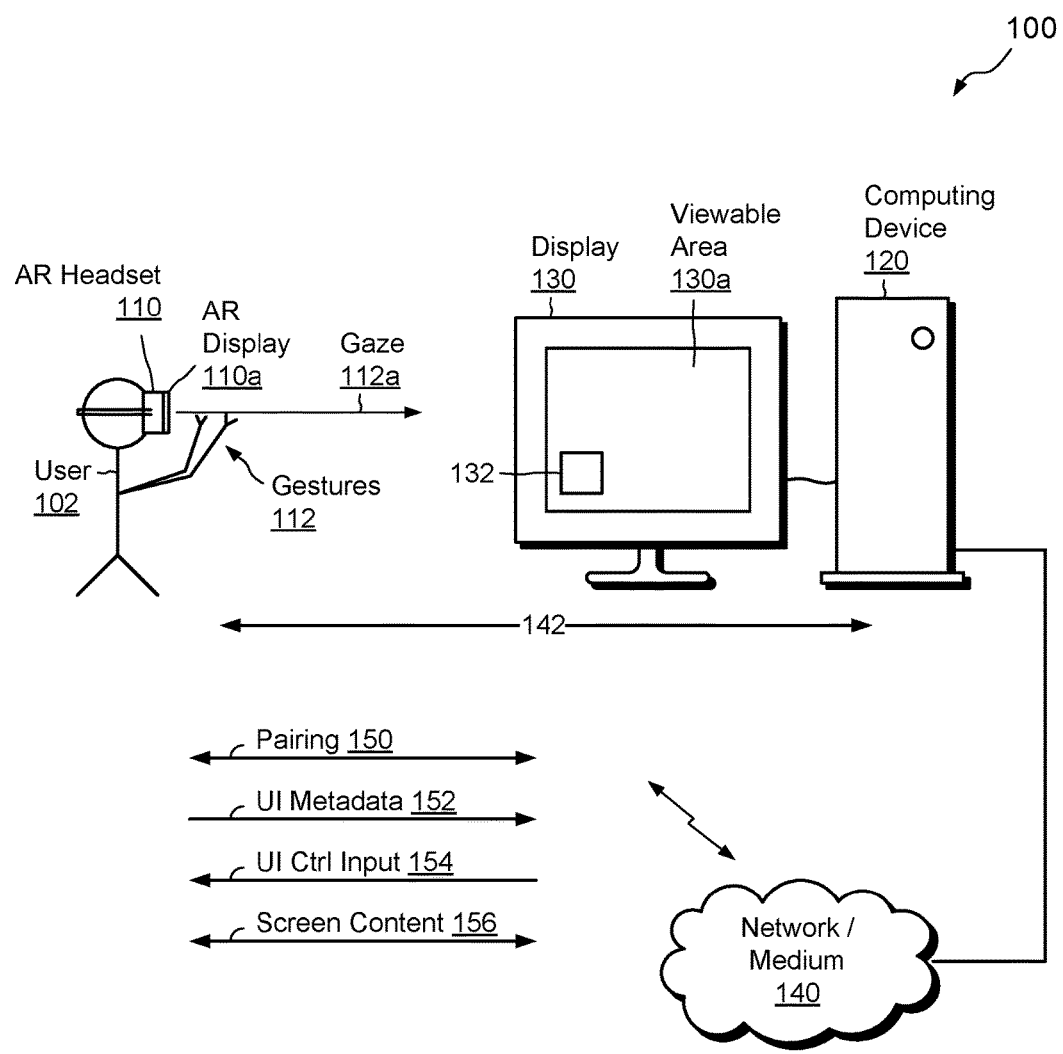
FIG. 1 is a block diagram of an example environment in which embodiments of the improved technique hereof can be practiced. The example environment includes a user operating an AR headset to control a computing device having a display.

FIG. 1 shows an example environment 100 in which embodiments of the improved technique hereof can be practiced. Here, a user 102 wears an AR headset 110 in a location that includes a computing device 120, such as a desktop computer, laptop computer, tablet computer, smart phone, PDA (Personal Data Assistant), or any other computing device capable of running software programs. The computing device 120 is connected to a display 130, e.g., using VGA (Video Graphics Array), HDMI (High Definition Multimedia Interface), USB (Universal Serial Bus), FireWire, Bluetooth, or any other means, which may be wired or wireless. The display 130 has a viewable area 130a in which pixels can be rendered. The computing device 140 is connected to a network/medium 140, such as a LAN (Local Area Network), a Bluetooth network, or any other wired or wireless network or medium. The AR headset 110 is also connected to the network/medium 140, e.g., using a wireless connection, such as Wi-Fi, Bluetooth, a cell phone network, etc. Although shown as a computer monitor, one should appreciate that display 130 may also be realized using a television display, a projector, a laptop screen, a smart phone screen, a tablet screen, a PDA screen, and/or as any display device capable of rendering visually perceptible images of electronically-generated content.

In example operation, user 102 wears the AR headset 110 and can observe the environment 100 through the transparent display 110a. For example, the user 102 can see the computing device 120 and the display 130. The user may also see system holograms that the AR headset 110 has projected onto the AR display 110a, such that they appear as three-dimensional objects in the environment 100. These system holograms enable the user 102 to control the AR headset 110, such as to run programs loaded onto the AR headset 110, to view content accessible through the AR headset 110, and so forth.

In accordance with improvements hereof, the user 102 may take action to effect pairing 150 of the AR headset 110 with the computing device 120, or pairing may proceed automatically. As will be described, pairing 150 can proceed in numerous ways, with one example being that the computing device 150 displays an image element 132 on the display 130. The image element 132 presents, in graphical form, an address or other identifier of the computing device 120, such as a network address. One or more cameras in the AR headset 110 acquire an image of the element 132, and a processor within the AR headset 110 extracts the address information from the element 132. The AR headset 110 may then issue a communication request to the computing device 120 at the indicated address. The computing device 120 receives the request and responds. The AR headset 110 and the computing device 120 may then establish a communication pathway 142.

With pairing 150 complete, the AR headset 110 may display UI control holograms for enabling the user 102 to control the computing device 120 and/or any software program running on the computing device 120. In some examples, the AR headset 110 communicates with the computing device 120 to identify a software program that currently has focus and presents UI control holograms that are suitable for use with that software program. In some examples, the software program may be a legacy program, which is not AR-aware, i.e., not designed specifically to support AR control, and the UI control holograms present general controls, which may act, for example, as replacements for keyboard and/or pointer controls (e.g., scroll up, scroll down, point, click, etc.). In other examples, the software program may be AR-aware. In such cases, the software program running on the computing device 120 may provide UI control input 154 to the AR headset 110, which specifies AR-aware controls that the software program supports. The AR headset 110 may then render the AR-aware controls as holograms to enable the user to interact with the software program in arbitrarily sophisticated ways.

The user 102 may interact with UI control holograms using gestures 112 (e.g., hand motions, gaze, etc.). When the user interacts with a UI control hologram, the AR headset 110 generates UI metadata 152 and sends the UI metadata 152 to the computing device 120 over the communication pathway 142. In some examples, the AR headset 110 translates the user gestures into conventional computing inputs, such as pointer actions, keyboard entry, and so forth. For instance, the AR headset 110 may translate gaze into pointer movement and may translate simple hand motions into mouse clicks. The computing device 120 receiving the UI metadata 152 can then apply the input as it would apply input from a local pointer or keyboard. In some examples, the AR headset 110 sends the UI metadata 152 in some other format besides pointer action, keyboard entry, and so forth. A component running in the computing device 120 translates the UI metadata 152 into actions to be performed in connection with the software program.

In a particular example, a software program running on the computing device 120 is a web conferencing program, and the user 102 can interact with the web conferencing program using gestures. For instance, the user 102 can mute a conference participant by performing a particular gesture on a UI control hologram that represents that participant. The user 102 can thus avoid having to perform a more complex set of actions using the keyboard and/or mouse. As the AR headset renders the entire environment as potential space for UI controls, such controls can be larger, more conspicuous, and easier to access and manipulate the than the analogous controls on a traditional display.

In some examples, the user 102 can share content available from the AR headset 110 with other conference participants, such as by performing a gesture 112 on a system hologram that represents a particular resource (e.g., a document, picture, slide show, etc.), and by performing another gesture 112, such as a gaze 112a, to drag and drop that resource into a conference window. Again, the user 102 can perform such actions in a simple and intuitive way, using the entire virtual environment as a potential workspace. The user 102 can also control whether content is rendered publicly (e.g., on the display 130) or privately (e.g., only on the display 110a of the AR headset).

In another particular example, a software program performs remote desktop functions that control a remote computing device. In such cases, controlling the software program via the AR headset 110 effects control over the remote computing device.

According to some embodiments, the AR headset 110 receives screen content 156 from the computing device 120. For example, the screen content 156 represents graphical information that would normally be used for rendering content on a primary monitor, an extended monitor, or a mirrored monitor. Rather than using a monitor, however, the AR headset 110 renders the screen content as a hologram. In an example, the AR headset 110 presents the screen content 156 on a surface, such as a wall, table, etc., or floating in empty space. The user 102 is thus able to view the hologram of the screen content 156 for use as a primary display, an extended display, or a mirrored display. In some examples, screen content 156 also flows from the AR headset 110 to the computing device 120, e.g., to render controls and/or content generated by the AR headset 110 on the display 130.

Figures 2A, 2B:
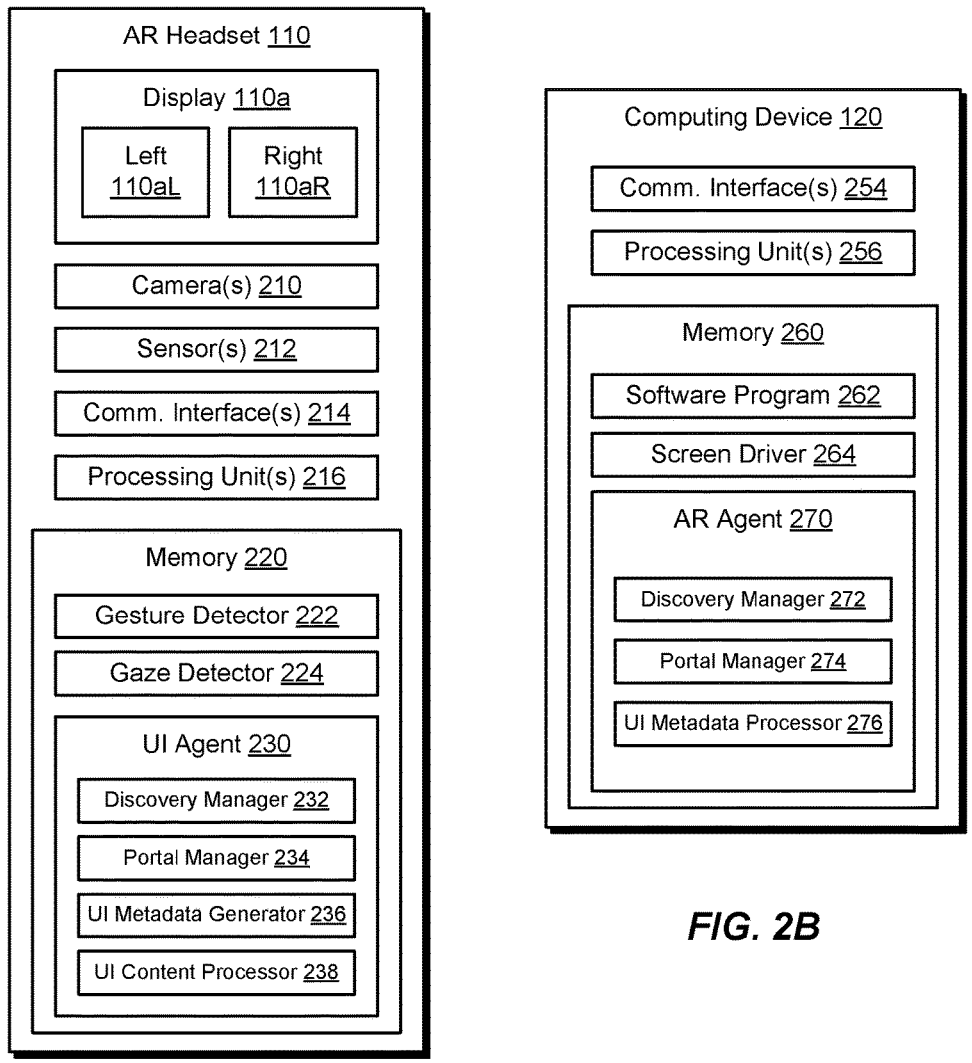
FIGS. 2A and 2B are block diagrams respectively showing example components of the AR headset and computing device of FIG. 1.

FIGS. 2A and 2B respectively show example arrangements of the AR headset 110 and computing device 120. As shown in FIG. 2A, the AR headset 110 includes the display 110a, including left (110aL) and right (110aR) portions, cameras 210, sensors 212 (e.g., motion sensors), one or more communications interfaces 214 (e.g., Wi-Fi, Bluetooth, etc.), a set of processing units 216 (e.g., one or more processing chips, cores, and/or assemblies), and memory 220. The memory 220 includes both volatile memory (e.g., RAM), and non-volatile memory, such as one or more ROMs, disk drives, solid state drives, and the like. The set of processing units 216 and the memory 220 together form control circuitry, which is constructed and arranged to carry out various methods and functions as described herein. Also, the memory 220 includes a variety of software constructs realized in the form of executable instructions. When the executable instructions are run by the set of processing units 216, the set of processing units 216 are caused to carry out the operations of the software constructs. Although certain software constructs are specifically shown and described, it is understood that the memory 220 typically includes many other software constructs, which are not shown, such as an operating system, various applications, processes, and daemons.

As further shown in FIG. 2A, the memory 220 "includes," i.e., realizes by operation of software instructions, gesture detector 222, gaze detector 224, and UI agent 230. The gesture detector 222 is configured to detect gestures 112 of the user 102, while the gaze detector 224 is configured to detect gaze 112a of the user 102, e.g., by detecting orientation of the AR headset 110 in a particular direction for greater than some minimum, predetermined interval of time.

The UI agent 230 includes discovery manager 232, portal manager 234, UI metadata generator 236, and UI content processor 238. In an example, the UI agent 230 is provided for the purpose of controlling computing devices, like the computing device 120. Discovery manager 232 manages discovery of computing devices and pairing 150 of the AR headset 110 with computing devices. Portal manager 234 identifies displays (like display 130) of computing devices and projects holograms onto the AR display 110a, such that the user 102 can see the holograms in a stable spatial relationship with respect to such displays. UI metadata generator 236 generates UI metadata 152 based on gestures 112, and UI content processor 238 processes UI control input 154.

Turning now to FIG. 2B, computing device 120 is seen to include a set of communication interfaces 254 (e.g., Ethernet, Wi-Fi, Bluetooth, etc.), a set of processing units (e.g., one or more processing cores, chips, and/or assemblies), and memory 260, which may include both volatile and non-volatile memory. The memory 260 includes, i.e., realizes by operation of software instructions, one or more software programs 262 (e.g., a web conferencing program, a remote desktop program, or any type of program), a screen driver 264 (for rendering screen content), and an AR agent 270. The AR agent 270 includes a discovery manager 272, which participates in discovery and pairing 150, a portal manager 274, which combines graphical content of the computing device 120 with graphical content from the AR headset 110, and a UI metadata processor 276, which receives, interprets, and applies UI metadata 152 received from the AR headset 110.

Figure 3:
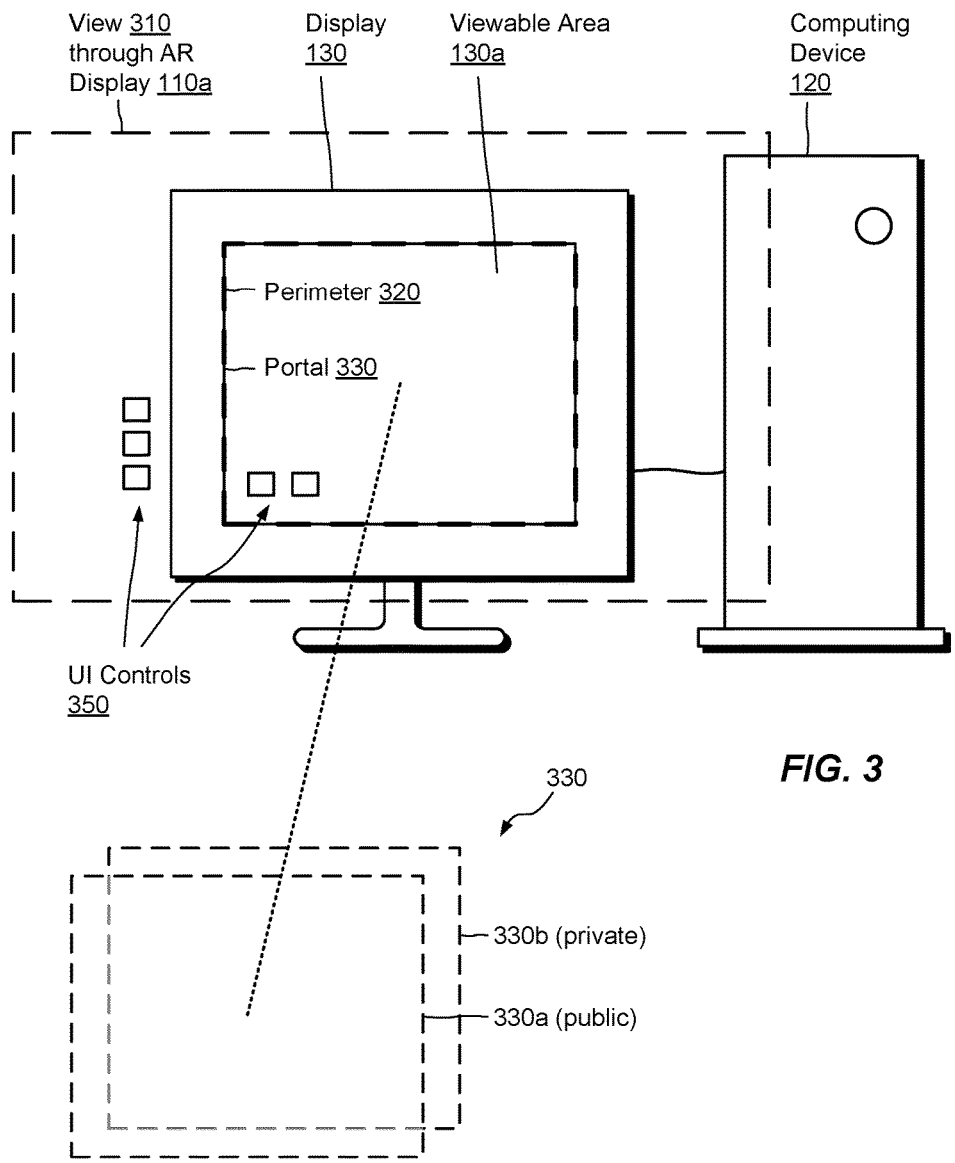
FIG. 3 shows an example view of the computing device and display of FIG. 1, as seen through the AR headset of FIG. 1.

FIG. 3 shows an example view that the user 102 may observe while using the AR headset 110 after pairing 150 is complete. Rectangle 310 shows the field of view of the AR display 110a. As indicated, the user 102 can see the computing device 120 and its display 130 through the transparent display 110a of the AR headset 110 and/or using peripheral vision outside a frame of the display 110a. The display 130 is seen to have a viewable area 130a, which has a perimeter 320.

The AR headset 110 constructs a portal 330 within the field of view 310. The portal 330 has a rectangular shape, which conforms to the perimeter 320. In an example, portal manager 234 (FIG. 2) generates the portal 330 by detecting the viewable area 130a of the display 130, identifying its borders, and constructing the portal 330 such that it encloses the viewable area 130a. In some examples, the AR headset 110 projects a rectangular hologram that identifies the portal 330, e.g., as a glowing outline, box, or in some other manner. There is no requirement for the AR headset 110 to display any visual indication of the portal 330 to the user 102, however, as the display area 130a may already be visible to the user 102 directly.

The portal 330 defines a shared canvas on which both the AR headset 110 and the computing device 120 can render visual content. The AR headset 110 renders pixels in the portal 330 in the portion of its own display 110a where the viewable area 130a appears. The computing device 120 renders pixels in the portal 330 directly, via output to the display 130. The portal 330 can thus be regarded as having two layers: a first layer 330a, which the computing device 120 renders on display 130, and a second layer 330b, which the AR headset 110 renders on AR display 110a. In an example, both the computing device 120 and the AR headset 110 can contribute content to both layers 330a and 330b. Content of the first layer 330a is visible to anyone in sight of the display 130 and is thus public, whereas content of the second layer 330b is visible only to the user 102 through the AR headset 110 and is thus private.

As further shown in FIG. 3, the AR headset 110 projects holograms of UI controls 350, e.g., in response to UI control input 154 or otherwise, for controlling the computing device 120 and/or any software program 262 running thereon. The AR headset 110 may display different UI controls 350 for different software programs 262. In some examples, the AR headset 110 renders UI controls 350 such that they maintain fixed apparent locations in the environment (or relative to the display 130). However, the UI controls 350 may be rendered anywhere in the environment and may follow the user 102, rather than staying in place relative to the display 130.

One should appreciate that the field of view 310 is typically mobile relative to the display 130, as the AR headset 110 changes position and/or orientation. The AR headset 110 compensates for motion by continually updating the position, orientation, and perspective of the second layer 330b rendered on the display 110a, such that the second layer 330b appears to the user 102 to remain registered with the first layer 330a. If the display 130 is itself moved, the AR headset adjusts by updating the second layer 330b such that it continues to overlay the first layer 330a on the display 130.

Figure 4:
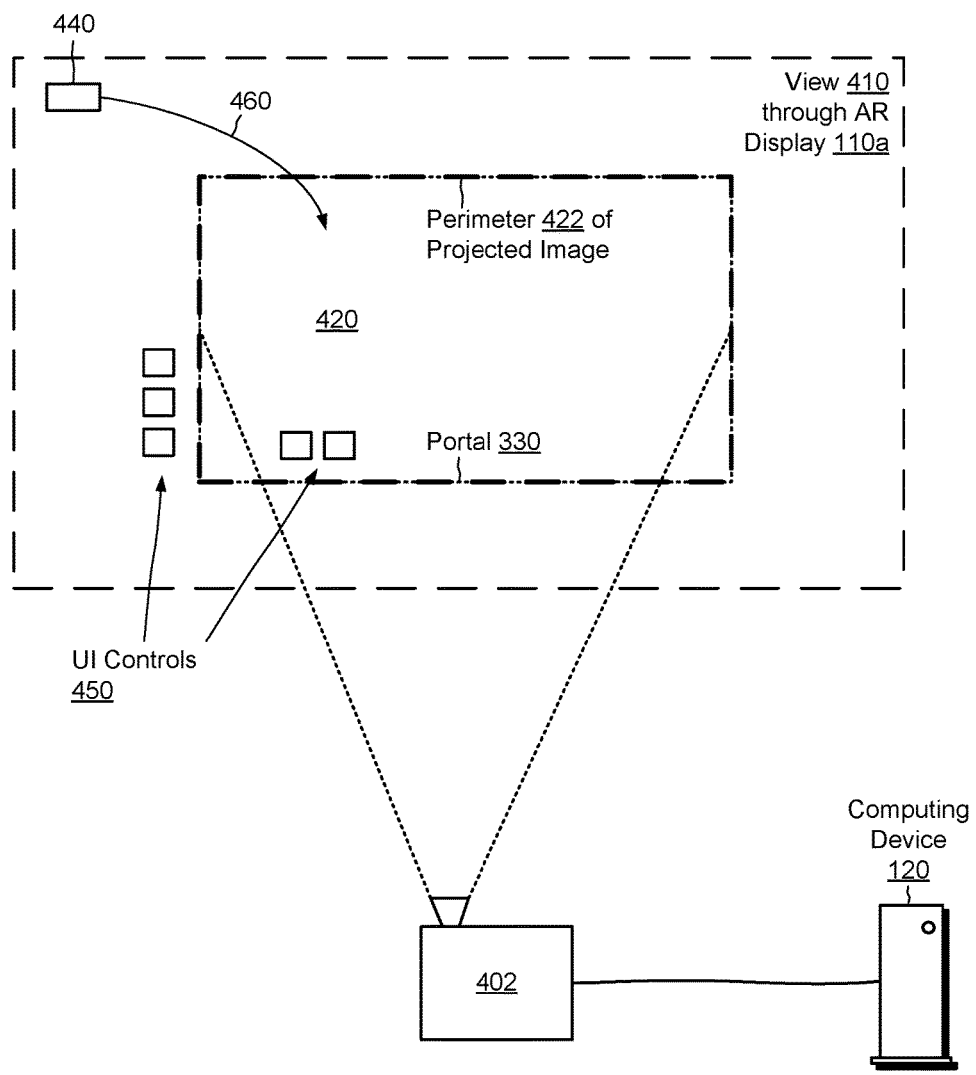
FIG. 4 shows an example view of a screen on which a projector projects a display of the computing device, as seen through the AR headset of FIG. 1.

FIG. 4 shows an example arrangement in which the computing device 120 is connected to a projector 402. The computing device 120 employs the projector 402 as a sole monitor, a mirrored monitor, or an extended monitor, for example. The projector 402 projects an image 420 onto a screen, wall, or other surface. The projected image 420 has a perimeter 422. Elements are shown after pairing 150 has taken place. Here, the AR headset 110 treats the projected image 420 as it did the viewable area 130a in FIG. 3. For example, the AR headset 110 identifies the perimeter 422 of the projected image 420 and constructs a portal 330 so as to encompass the projected image 420. The AR headset 110 projects UI controls 450, in this case both within the portal 330 and outside the portal 330.

In this example, the AR headset 110 also projects a local AR control 440. The local AR control 440 is a hologram that represents a resource stored in or otherwise accessible to the AR headset 110. In an example, the user 102 summons the local AR control 440, e.g., by performing a particular gesture. The user 102 can then perform actions on the local AR control 440, e.g., to open a file, copy a file, etc.

In an example, the AR local control 440 represents a document, presentation, slide show, picture, or the like. For instance, the local AR control 440 may represent an item in a virtual bookshelf supported by the AR headset 110. As shown by arrow 460, the user 102 may perform one or more hand gestures and/or may direct gaze in a manner that directs the AR headset 110 to transfer the document or other item to the computing device 120. For example, the user 102 may perform a hand gesture 112 to grab the local AR control 440 and direct gaze 112a to an area within the portal 330. Upon detecting this gesture and gaze, the AR headset 110 copies the item represented by local AR control 440 to the computing device 120, e.g., over the communication pathway 142 (FIG. 1), and sends control information that directs the computing device 120 to display the copied item. As a result, the item represented by local AR control 440 appears within the projected image 420, where it can be viewed publicly by anyone in view of the projected image 420. If the item is a slideshow, the user 102 may advance through the slideshow using simple gestures, like tapping, swiping, etc., may zoom in or out using pinching, and so forth. Many possibilities are thus made available for presenting, sharing, and collaborating.

Sharing of content in this manner is not limited to circumstances involving a projector. For example, the computing device 120 may run web conferencing or other collaboration software, and the user 102 may employ the above-described grab-and-drop feature to share content available from the AR headset 110 with other participants.

According to some variants, the item represented by local AR control 440 is not itself copied to the computing device 120. Rather, screen data is sent for viewing the item. The computing device 120 then renders the screen data in the projected image 420, i.e., in the first layer 330a of the portal 330, where the screen content is publicly viewable.

Figure 5:
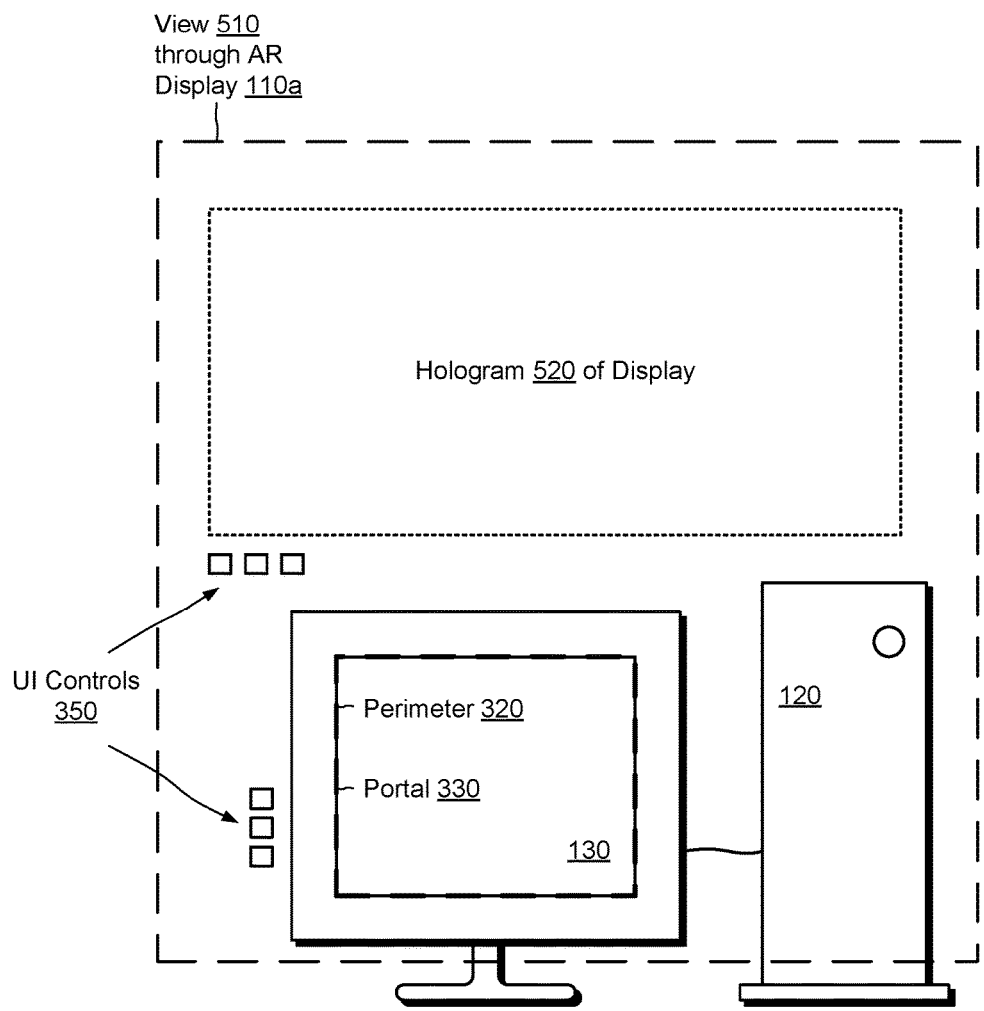
FIG. 5 shows an example view of the display of the computing device and a hologram showing a projected screen of the computing device, as seen through the AR headset of FIG. 1.

FIG. 5 shows another example view from the perspective of the user 102. Reference 510 depicts the user's view 510 through the AR headset 110. In this example, the AR headset 110 receives screen content 156 from the computing device 120 (FIG. 1) and displays the screen content 156 within a hologram 520. The hologram 520 may be projected to appear on the back wall, on some other surface, or floating in space. The AR headset 110 may project the hologram 520 as pinned to a particular location relative to the environment, or it may project the hologram 520 at some location that follows the user 102 as the user moves. The screen content may represent a sole display, an extended display, or a mirrored display of the computing device 120, for example. The hologram 520 may be of any apparent size. Therefore, the user 102 may enjoy the benefit of a very large display without the associated cost, power, and need for physical space.

In some examples, there is no need for an actual display 130 to be present in order for the AR headset 110 to render the hologram 520. For example, the computing device 120 may have no connected display 130 or the display 130 may be invisible or turned off. In such cases, the AR headset 110 may display the hologram 520 and construct the portal 330 such that it circumscribes the hologram 520. The portal 330 continues to act as a shared canvas, with the computing device 120 rendering data for the first layer 330a and the AR headset 110 rendering data for the second layer 330b, but with the AR headset 110 displaying content for both layers 330a and 330b.

In some examples, the AR headset 110 projects the hologram 520 in a manner that follows the user 102 as the user moves from one location to another. For example, the user 102 can leave a physical space where the computing device 120 is located, while continuing to see the projected hologram 520 located close by. Thus, the user 102 can continue to work or otherwise interact with the computing device 120 using the AR headset 110, even when the user 102 and the computing device are in different physical spaces. If the communication pathway 142 extends over network, the AR headset 110 can move nearly anywhere in space relative to the computing device 120, as long as the AR headset 110 and the computing device 120 can each connect to the network. The AR headset 110 and the computing device 120 can be on different sides of a room or on opposite sides of a planet.

As there is no need for the AR headset 110 and the computing device 120 to be local to each other, new opportunities arise for remote desktop control. For example, the AR headset 110 can remotely control any computing device as long as it can pair with that computing device. The ability to project a hologram 520 of screen content enables the AR headset 110 to interact with the remote computing device over any distance.

One should appreciate that the AR headset 110 can project holograms 520 for any number of displays of the computing device 120. For example, if the computing device 120 has two monitors, the AR headset 110 can project two holograms 520, one for each monitor. In addition, the AR headset 110 can project holograms 520 even for monitors that are not physically present. The user 102 could be surrounded by any number of holograms 520 in virtual space, with each hologram 520 displaying screen content of a display space from the computing device 120, even if the computing device 120 has only a single monitor, or no monitor at all.

Figure 6:
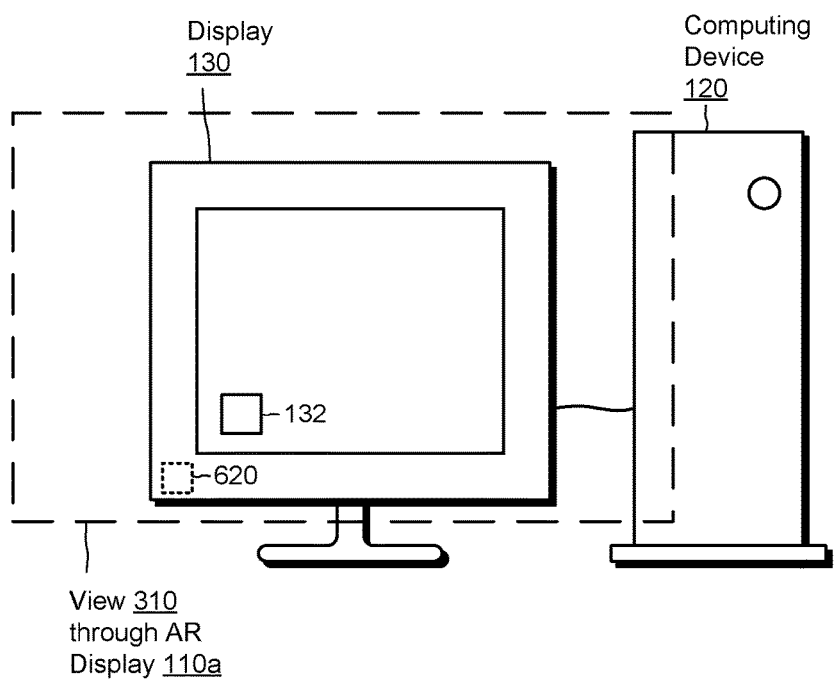
FIG. 6 shows an example view of the display of the computing device, which renders an element used when pairing the AR headset with the computing device.

FIG. 6 shows another example view from the perspective of the user 102. Here, the depicted view shows an arrangement prior to pairing 150. The display 130 displays an image element 132 (shown also in FIG. 1), which presents address or other identifying information of the computing device 120, such as its IP (Internet Protocol) address, MAC (Media Access Control) address, or other address. The image element 132 may include a QR (Quick Response) code, a Vuforia VuMark, a barcode, a series of characters, or any representation or combination thereof that can identify the computing device 120.

In some embodiments, a label 620 is provided in place of an image element 132, or in addition thereto. The label 620 may be an adhesive-backed label or other type of label and may assume any of the same forms as the image element 132. In further examples, the label 620 is provided as an RFID (Radio Frequency IDentification) label, which may be read by an AR headset equipped with an RFID reader.

Figure 7:
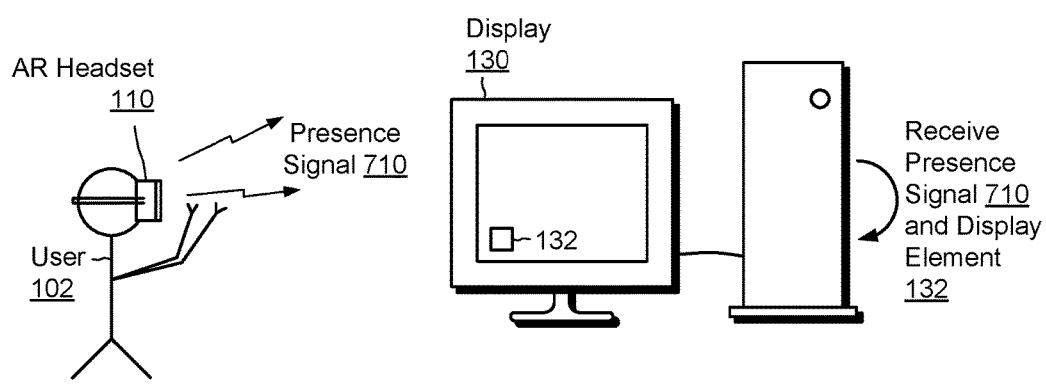
FIG. 7 is a block diagram of an example arrangement in which pairing is facilitated by the AR headset emitting a presence signal.

FIG. 7 shows an example arrangement for facilitating pairing 150. As shown, the AR headset 110 is configured to emit a presence signal 710, e.g., a signal that broadcasts the fact that it is an AR headset 110. In this example, the computing device 120 receives the presence signal 710 and responds by displaying the image element 132. Thus, for example, the computing device 120 is configured to display the image element 132 whenever it detects the presence of an AR headset in its vicinity. Conversely, the computing device 120 may be configured not to display the image element 132 when no presence signal 710 is detected, thus enabling the computing device 120 to use the screen space occupied by the image element 132 for other purposes.

One should appreciate that the presence signal 710 enables the AR headset 110 to pair seamlessly with computing devices in its vicinity. For example, the user 102 can approach any computing device 120, and the AR headset 110 can capture an image of the displayed element 132, initiating pairing 150 with that computing device with little or no effort on the part of the user 102. The presence signal may assume any suitable form, such as a Wi-Fi signal, a Bluetooth signal, a radio signal, an infrared signal, an RFID signal, or any other signal capable of identifying the presence of the AR headset 110 to local computing devices.

Figure 8:
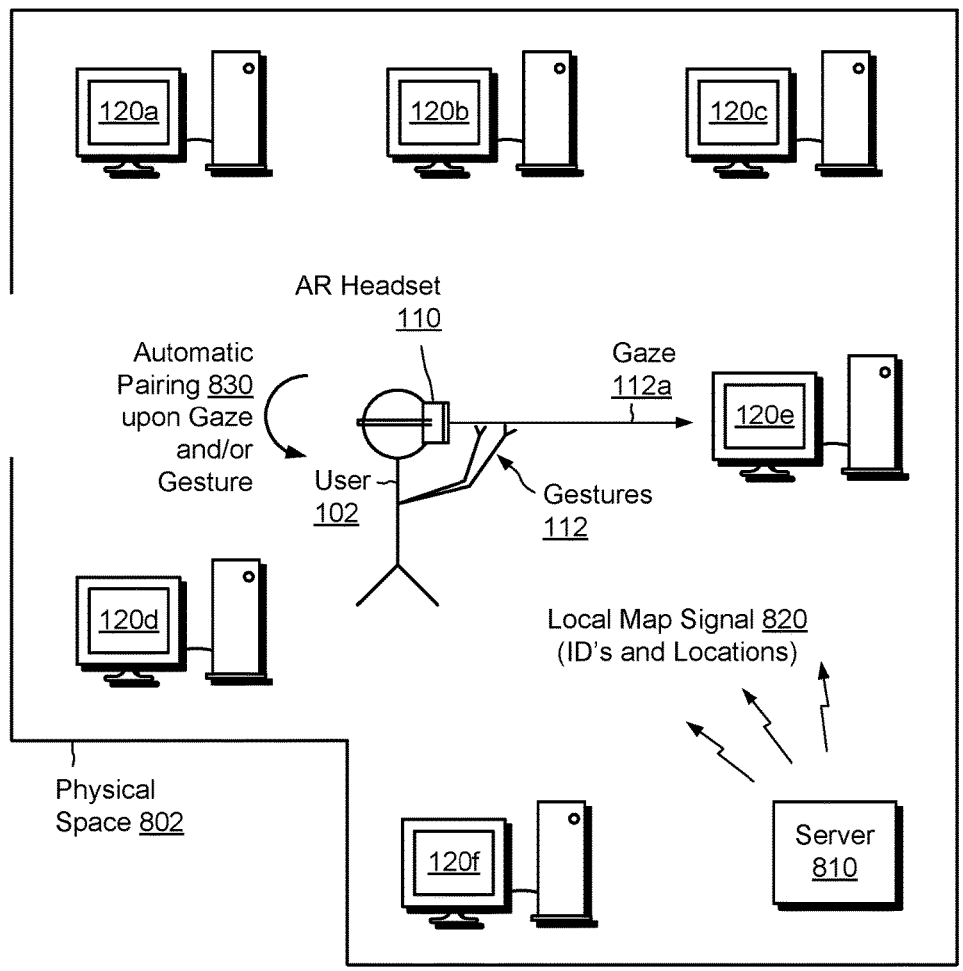
FIG. 8 is a block diagram of an example arrangement in which pairing is facilitated by a server in a physical space transmitting map information about computing devices in that space.

FIG. 8 shows another example arrangement for facilitating pairing 150 of the AR headset 110 with a computing device. Here, the user 102 enters a space 802, such as an office, lab, or other room, which includes multiple computing devices 120a through 120f. In this example, a server 810 broadcasts a local map signal 820. The local map signal 820 is generally a short-range signal that provides addresses (e.g., IP addresses, MAC addresses, etc.) and/or other identifying information about computing devices in the space 802, as well as their respective locations in the space 802. Location information may be relative to the space 802 itself, e.g., relative to its walls, floor, ceiling, and or other features. The AR headset 110 receives the local map signal 820 and compares the direction of gaze 112a with the locations of the computing devices. If the AR headset 110 detects that the gaze 112a intersects with one of the computing devices, the AR headset 110 initiates pairing 150 with that computing device, i.e., the computing device that the signal 820 associates with the gazed-to location. In some examples, an additional gesture 112 may be required for confirmation before pairing is initiated, e.g., to avoid inadvertently pairing as a result of the user 102 merely looking in a certain direction. With this arrangement, the user 102 may seamlessly and with little effort move from one computing device to another, controlling each computing device in turn.

The server 810 may be a stand-alone server, or it may be implemented in any of the computing devices 120a through 120f or in some other computing device. In some examples, the server 810 transmits the local map signal 820 in response to detecting a presence signal 710 (FIG. 7) emitted by the AR headset 110. Upon such detection, the server 810 may direct the computing devices 120a through 120f to display their respective image elements 132, or the computing devices 120a through 120f may themselves detect the presence signal 710 and respond by displaying their image elements 132.

One should appreciate that embodiments hereof are not limited to pairing 150 through the use of image elements 132 and/or labels 620. Rather, image elements and labels are merely convenient options. Other options may include, for example, a list stored in the AR headset 110 of computing devices that are candidates for pairing and associated addresses or other identifying information. The AR headset 110 can then pair with any listed computing device, regardless of its location, by using gestures to select that computing device from the list.

Figure 9:
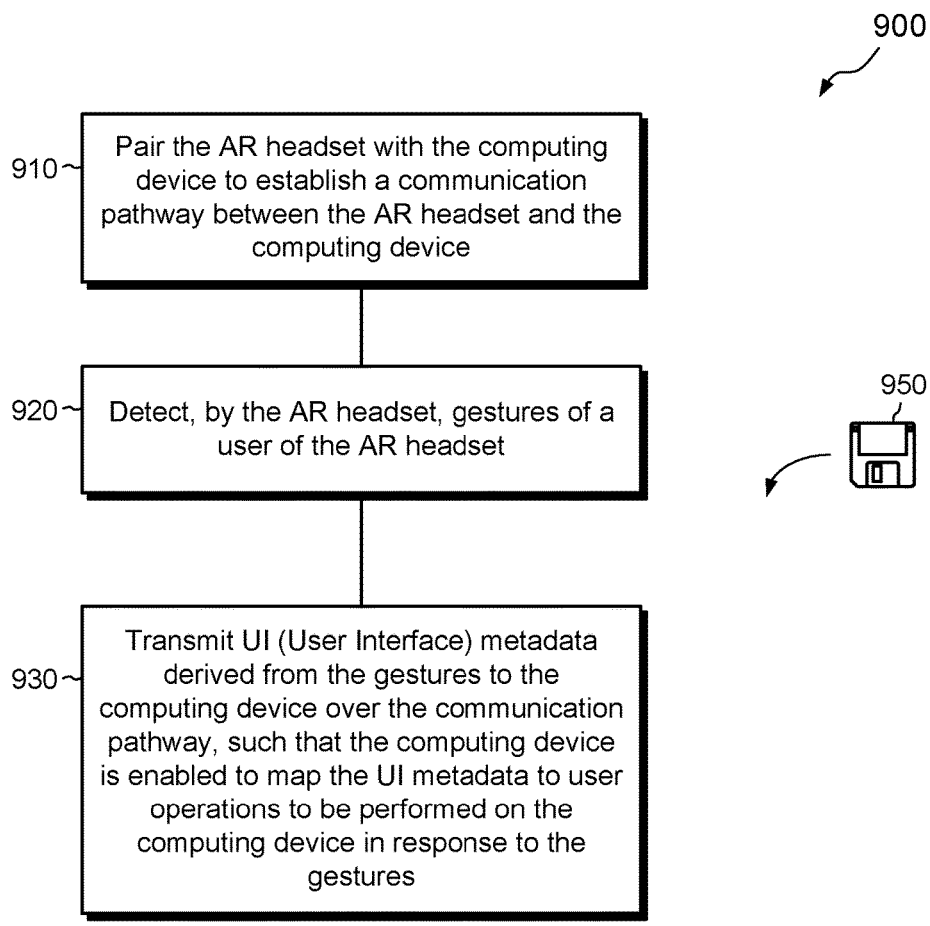
FIG. 9 is a flowchart showing an example method of controlling a computing device using an AR headset.

FIG. 9 shows an example method 900 that may be carried out in connection with the environment 100. The method 900 is typically performed, for example, by the software constructs described in connection with FIG. 2, which reside in the memory 220 and/or 260 of the AR headset 110 and/or computing device 120 and are run by the set of processing units 216 and/or 256. The various acts of method 900 may be ordered in any suitable way. Accordingly, embodiments may be constructed in which acts are performed in orders different from that illustrated, which may include performing some acts simultaneously.

At 910, the AR headset 110 is paired with the computing device 120 to establish a communication pathway 142 between the AR headset 110 and the computing device 120. For example, pairing 150 is established in response to the AR headset 110 acquiring an image of an element 132 and connecting to the computing device identified by the image element 132 over the network/medium 140.

At 920, the AR headset 110 detects gestures 112 of a user 102 of the AR headset 110. For example, the AR headset 110 may detect a hand gesture 112, a gaze 112a, or a combination of hand gestures and gazes.

At 930, UI (User Interface) metadata 152 derived from the gestures 112 are transmitted to the computing device 120 over the communication pathway 142, such that the computing device 120 is enabled to map the UI metadata 152 to user operations to be performed on the computing device 120 in response to the gestures 112.

In the manner described, the user 102 is able to control the computing device 120 using gestures. The user 102 is thus free to move around while continuing to interact with the computing device 120. New techniques for controlling computing devices have been presented and are envisioned, which enable users to interact with computing devices in more natural and less constrained ways, and which are expected to improve users' well-being, health, and effectiveness.

Having described certain embodiments, numerous alternative embodiments or variations can be made. For example, the AR headset 110 may take a variety of different forms. For example, the AR headset 110 can be provided as an integrated unit, as with the Microsoft HoloLens, or as different components, such as AR glasses and a separate control unit. Thus, embodiments hereof are not limited to any particular implementation of AR headset.

Also, the communication pathway 142 need not be established through a single network or medium. Rather, the communication pathway 142 may include multiple networks and/or media having any number of protocols.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 950 in FIG. 9). Any number of computer-readable media may be used. The media may be encoded with instructions which, when executed on one or more computers, processors, or other control circuitry, perform the processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of controlling a computing device using an AR (Augmented Reality) headset, the method comprising:
   pairing the AR headset with the computing device to establish a communication pathway between the AR headset and the computing device;
   detecting, by the AR headset, gestures of a user of the AR headset; and
   transmitting UI (User Interface) metadata derived from the gestures to the computing device over the communication pathway, such that the computing device is enabled to map the UI metadata to user operations to be performed on the computing device in response to the gestures,
   wherein the method further comprises projecting, onto a transparent display of the AR headset, a set of holographic images, each of the set of holographic images projected to appear to the user in in three dimensional space when viewed through the transparent display,
   wherein the set of holographic images includes a set of UI control holograms for operating the computing device, and wherein transmitting the UI metadata is performed, for at least some of the UI metadata, in response to the user interacting with the set of UI control holograms using gestures, and
   wherein the method further comprises:
      while detecting a gaze of the user directed toward one of the UI control holograms, also detecting, by the AR headset, another concurrent gesture performed by the user;
      mapping, by the AR headset, the gaze and the other concurrent gesture to corresponding UI metadata; and
      sending, by the AR headset, the corresponding UI metadata to the computing device, the corresponding UI metadata indicating a UI command to the software program.

2. The method of claim 1, further comprising:
   constructing a portal that represents a region of screen content that the AR headset and the computing device have in common.

3. The method of claim 2, wherein constructing the portal includes providing a shared canvas on which both the AR headset and the computing device render graphical content, the shared canvas having a first layer that represents public content rendered by the computing device and a second layer that represents private content rendered by the AR headset.

4. The method of claim 3, further comprising displaying, by the AR headset, holographic borders immediately surrounding the portal.

5. The method of claim 4, wherein displaying the holographic borders includes rendering, by the AR headset, the holographic borders as a glowing outline.

6. The method of claim 2,
   wherein the computing device runs a software program, and
   wherein the AR headset generates the UI control holograms in response to the AR headset receiving input from the software program, the input specifying AR-aware UI controls that the software program supports.

7. The method of claim 1, wherein the AR headset further displays a set of visual representations of content available to the AR headset, and wherein the method further comprises:
   detecting, by the AR headset, a set of gestures performed by the user, at least one of the set of gestures performed on a particular representation of content; and
   in response to detecting the set of gestures, sending at least one of (i) the content represented by the particular representation or (ii) screen data depicting viewable images of the content over the communication pathway to the computing device, thereby enabling the computing device to display the content or viewable images thereof on a display of the computing device.

8. The method of claim 7, wherein the display of the computing device is realized using any of (i) a computer monitor, (ii) a television display, (iii) a projector, (iv) a laptop screen, (v) a smart phone screen, (vi) a tablet screen, and/or (vii) a PDA (Personal Data Assistant) screen.

9. The method of claim 7, wherein the display of the computing device includes a projector, and wherein the AR headset detecting the set of gestures results in the content or viewable images thereof being displayed by the projector.

10. The method of claim 7, wherein the software program is a web conferencing program, and wherein sending the content or viewable images thereof to the computing device effects sharing of the content or viewable images thereof with other participants in the web conference.

11. The method of claim 1, further comprising:
receiving, by the AR headset over the communications pathway, screen content generated by the computing device; and
projecting, on the transparent display of the AR headset, a holographic image of the screen content, the screen content from the computing device thereby being made viewable through the AR headset.

12. The method of claim 11, wherein the software program running on the computing device performs remote desktop functions to control a remote computing device, and wherein transmitting the UI metadata derived from the gestures to the computing device over the communication pathway effects remote control over the remote computing device.

13. The method of claim 11, wherein the screen content received by the AR headset includes content rendered by the computing device for one of (i) a sole display of the computing device, (ii) an extended display of the computing device, or (iii) a mirrored display of the computing device.

14. The method of claim 13, further comprising projecting, on the transparent display of the AR headset, multiple holographic images of screen content generated by the computing device, each such holographic image rendering screen content for a respective display space of the computing device, each display space corresponding to one of (i) a physical display of the computing device or (ii) a virtual display of the computing device.

15. The method of claim 1, wherein pairing the AR headset with the computing device includes:
acquiring, by one or more cameras of the AR headset, an image of an element rendered on the display of the computing device;
identifying, based on information presented in the rendered element, an address or other identifier of the computing device; and
sending, by the AR headset, a connection request to the computing device as identified by the address or other identifier,
wherein establishing the communication pathway between the AR headset and the computing device is performed in response to the computing device receiving and accepting the connection request.

16. The method of claim 15,
wherein pairing the AR headset with the computing device further includes broadcasting, by the AR headset, a presence signal that identifies a physical presence of the AR headset, and
wherein the AR headset acquires the image of the element in response to the computing device detecting the presence signal and displaying the image of the element in response thereto.

17. The method of claim 1, wherein pairing the AR headset with the computing device includes:
while the AR headset is located within a space in which multiple computing devices are disposed, receiving, by the AR headset, a transmitted signal, the transmitted signal including addresses or other identifiers of the computing devices and their respective locations within the space;
detecting, by the AR headset, a set of gestures, the set of gestures including a gaze in a particular direction within the space; and
in response to detecting the set of gestures, accessing information from the transmitted signal to determine whether the particular direction of the gaze corresponds to a location of one of the computing devices and, if so, (i) obtaining the address or other identifier of the computing device to which the gaze is directed and (ii) sending, by the AR headset, a connection request to the computing device as identified by the address or other identifier.

18. The method of claim 1, wherein pairing the AR headset with the computing device includes:
acquiring, by one or more cameras of the AR headset, an image of a label disposed adjacent to the display of the computing device;
identifying, based on information presented in the label, an address or other identifier of the computing device; and
sending, by the AR headset, a connection request to the computing device identified by the address or other identifier.

19. The method of claim 1, wherein the UI metadata derived from the gestures describes pointer and/or keyboard commands, such that the user can exercise pointer and/or keyboard control over the computing device using the gestures.

20. The method of claim 19, wherein the method further comprises deriving UI metadata from gestures, wherein deriving the UI metadata includes:
translating a detected change in user gaze to a corresponding pointer movement; and
translating a hand or finger-based gesture to a mouse click.

21. An AR (Augmented Reality) headset, comprising a transparent display and control circuitry that includes a set of processing units coupled to memory, the control circuitry constructed and arranged to:
pair with a computing device to establish a communication pathway between the AR headset and the computing device;
detect gestures of a user of the AR headset; and
transmit UI (User Interface) metadata derived from the gestures to the computing device over the communication pathway, such that the computing device is enabled to map the UI metadata to user operations to be performed on the computing device in response to the gestures,
wherein the method further comprises:
projecting, onto a transparent display of the AR headset, a set of UI control holograms for operating the computing device;
while detecting a gaze of the user directed toward one of the UI control holograms, also detecting, by the AR headset, another concurrent gesture performed by the user;
mapping, by the AR headset, the gaze and the other concurrent gesture to corresponding UI metadata; and
sending, by the AR headset, the corresponding UI metadata to the computing device, the corresponding UI metadata indicating a UI command to the software program.

22. A computer program product including a set of non-transitory, computer-readable media having instructions which, when executed by control circuitry of an AR (Augmented Reality) headset, cause the control circuitry to perform a method of controlling a computing device using the AR headset, the method comprising:
- pairing the AR headset with the computing device to establish a communication pathway between the AR headset and the computing device;
- detecting, by the AR headset, gestures of a user of the AR headset;
- transmitting UI (User Interface) metadata derived from the gestures to the computing device over the communication pathway, such that the computing device is enabled to map the UI metadata to user operations to be performed on the computing device in response to the gestures;
- constructing a portal that represents a region of screen content that the AR headset and the computing device have in common; and
- displaying, by the AR headset, holographic borders immediately around the portal,
- wherein constructing the portal includes providing a shared canvas on which both the AR headset and the computing device render graphical content, the shared canvas having a first layer that represents content rendered by the computing device and a second layer that represents content rendered by the AR headset.

* * * * *